Figure 1:
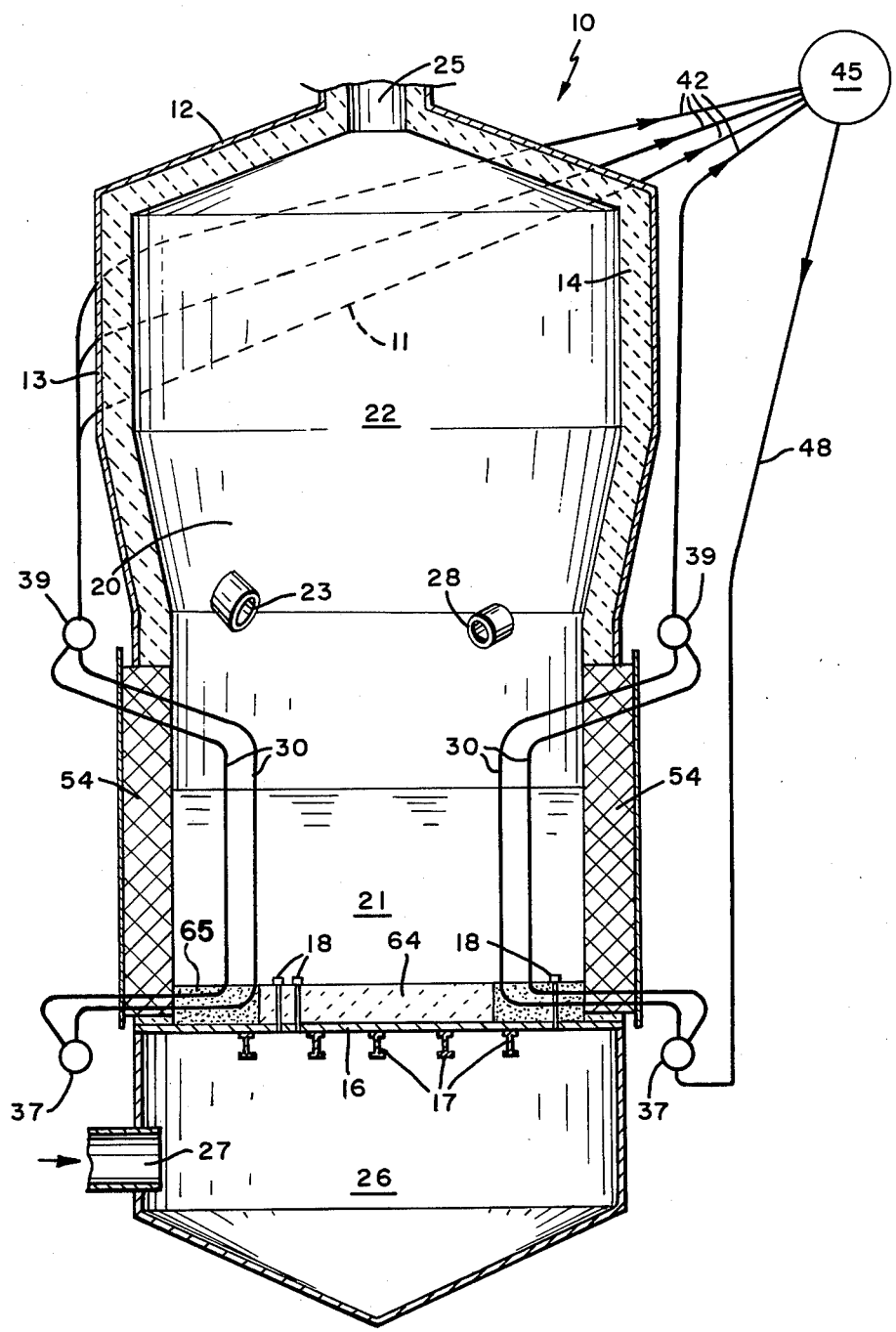

United States Patent [19]

Kwon et al.

[11] 4,314,967
[45] Feb. 9, 1982

[54] FLUIDIZED BED REACTOR WITH VERTICAL COOLING COILS

[75] Inventors: Henry S. C. Kwon, Norwalk; Walfred W. Jukkola, Westport, both of Conn.

[73] Assignee: Dorr-Oliver Incorporated, Stamford, Conn.

[21] Appl. No.: 193,286

[22] Filed: Oct. 2, 1980

[51] Int. Cl.$^3$ .................... B01J 8/24; F27B 15/14; B01J 8/44
[52] U.S. Cl. .................... 422/49; 34/57 A; 110/244; 110/245; 165/104.16; 431/7; 437/170; 432/3; 432/15; 432/76
[58] Field of Search .................... 422/49, 143, 146; 165/104 R, 104.16; 34/57 A; 431/7, 170; 110/244, 245; 432/3, 15, 76

[56] References Cited

U.S. PATENT DOCUMENTS

| | | | |
|---|---|---|---|
| 2,852,545 | 9/1958 | Jenny | 422/146 X |
| 2,920,940 | 1/1960 | Kronasher et al. | 422/146 X |
| 3,119,378 | 1/1964 | Marshall | 422/143 X |
| 3,679,373 | 7/1972 | Vancamp et al. | 422/146 |
| 3,833,051 | 9/1974 | Frank | 422/146 X |
| 3,898,043 | 8/1975 | Schutte et al. | 422/146 X |
| 3,982,901 | 9/1976 | Steever et al. | 422/143 |
| 3,983,927 | 10/1976 | Steever et al. | 165/104 F X |
| 4,096,909 | 6/1978 | Jukkola | 165/104.16 X |
| 4,158,693 | 6/1979 | Reed et al. | 422/46 |
| 4,176,710 | 12/1979 | Gansauge et al. | 422/146 X |
| 4,251,484 | 2/1981 | Daviduk et al. | 422/146 X |

Primary Examiner—Barry Richman
Attorney, Agent, or Firm—Harold M. Snyder; Burtsell J. Kearns

[57] ABSTRACT

A fluidized bed reactor is provided with heat exchange coils for controlling the temperature of the fluidized bed, with only vertically oriented sections of the coils exposed to the erosive conditions in the fluidized bed. The vapor-liquid circuit, of which the heat exchanger coils are a part, is arranged to operate on the principle of natural circulation. At least some of the tuyere elements discharge fluidizing gas at a level substantially above the constriction plate and the bed solids below the level of the tuyere gas discharge constitute a static layer during fluidization in which the lower angle bends of the heat exchange coils are embedded and so shielded from erosion by the fluidized solids of the bed proper. The static layer of bed solids also accommodates thermal expansion of the lower angle bend due to elevated temperatures and insulates the constriction plate from the high temperatures in the reactor. The upper angle bends of the heat exchange coils are located above the fluidized solids of the bed in the freeboard of the reactor. A plurality of the heat exchange coils may be fixed in removable hatches or panels provided in the wall of the reactor so that the heat exchange coils may be readily withdrawn from the reactor for maintenance purposes.

5 Claims, 3 Drawing Figures

FLUIDIZED BED REACTOR WITH VERTICAL COOLING COILS

This invention is directed to a novel arrangement for a heat exchanger structure provided to control the operating temperature of the fluidized bed of particulate solids in a fluid bed reactor.

Fluidized bed reactors are extremely versatile apparatus, which, in various forms, can carry out the processes of drying, sizing, roasting, calcining, heat treatment of solids with gases in the chemical, metallurgical and other materials processing fields, and the generation of hot gases, including steam, for use in driving electric power generation equipment. When the fluidized bed reactor is employed to carry out exothermic reactions, it is often necessary to prevent excessively high temperatures within the reactor by providing cooling means either within the freeboard volume or within the bed of fluidized solids. The cooling means may take the form of cooling coils through which a process fluid, which may be a gas or a liquid, is circulated to remove the excess heat. The heat removed by the fluid may often be used for heating in other stages of a process or for power generation. Sometimes cooling coils are located in the walls of the reaction chamber where they are well protected from the often severe erosive conditions within the reactor chamber.

The conditions within the fluidized bed are most severe of all in exothermic reactions because the temperature in the bed is likely to be higher than elsewhere in the reactor and the violent agitation and relatively high concentration of particulate solids lead to the most erosive conditions to be found in the reactor. It has been a common practice to orient inbed heat exchanger coils horizontally, with coils of hairpin configuration serially joined. Horizontal coil configurations of this type are to be seen in U.S. Pat. No. 2,789,034 to J. W. Swaine et al, issued Apr. 16, 1957, U.S. Pat. No. 2,825,628 to A. Johannsen et al, issued Mar. 4, 1958 and U.S. Pat. No. 4,096,909 to W. W. Jukkola, issued June 27, 1978. In general, horizontal configurations are best where only a modest amount of heat exchange surface area is required because the horizontal coils have a relatively simple mode of entry and support through the side of the reactor. Vertical orientation of the coils as employed in the past has either cluttered the freeboard region of the reactor with headers and support structure or complicated the structure associated with the constriction plate.

Horizontal coils are subject to abrasion which is many times greater than that experienced by vertically oriented coils. Such exposure to abrasion has a drastic effect on the life expectancy of horizontal coils and, under the same service conditions, vertical coils will have a life expectancy of at least three to five times that of horizontal coils. It will be understood that any angular bends provided in the tubes forming the heating coils, in the fluidized bed region of the reactor, are subject to substantial damage by abrasion due to the local turbulence created by the bends.

A novel arrangement of heat exchanger coils within a fluid bed reactor has now been provided wherein the heat exchanger coils are vertically oriented in the fluidized bed region of the reactor, but with upper and lower angled bends thereof protected or isolated from erosion in the bed.

It is an object of the invention to provide a fluidized bed reactor having an improved heat exchanger structure therein.

It is a further object of the invention to provide a fluidized bed reactor having readily removable or replaceable vertical heat exchanger coils.

Figure 3:
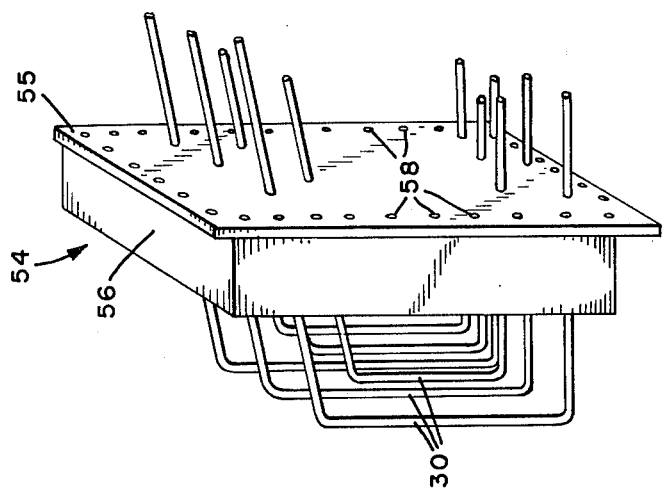
Figure 2:
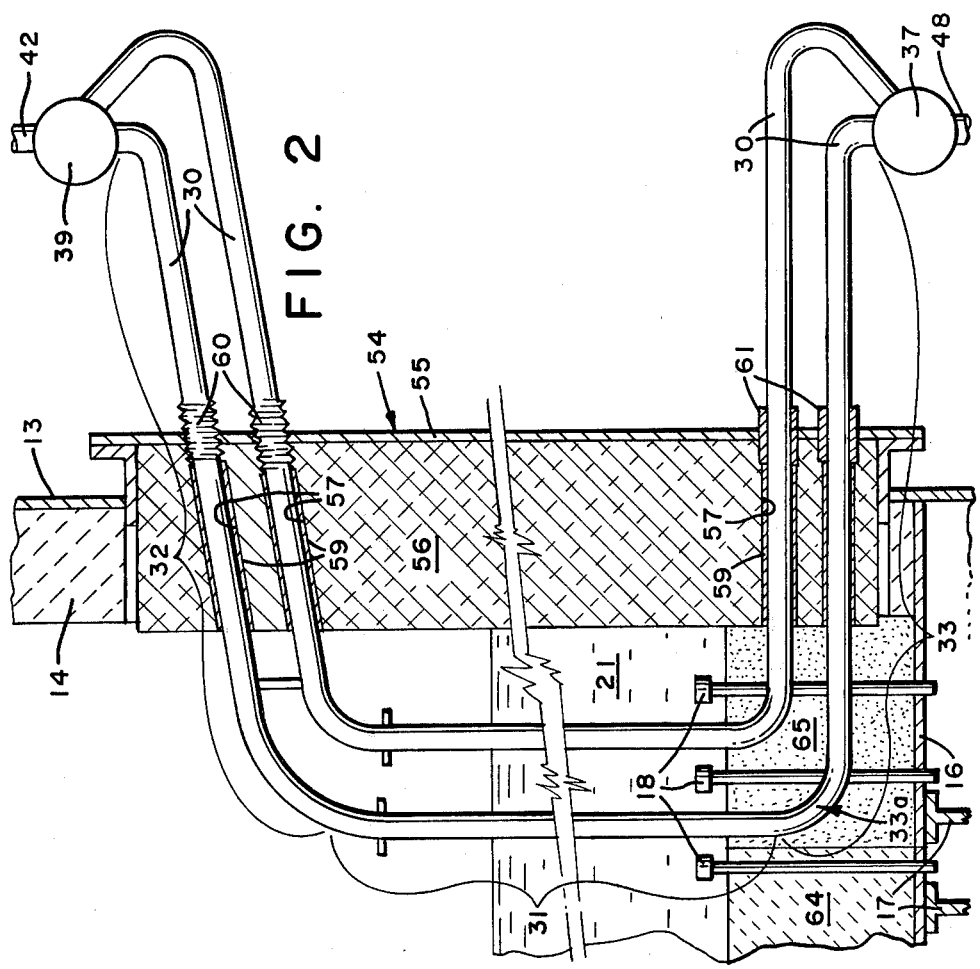

Other objects and advantages will become apparent from the following description taken in conjunction with the accompanying drawings in which:

FIG. 1 is a view partially in section of a fluidized bed reactor incorporating vertically oriented heat exchanger coils in accordance with this invention, FIG. 2 is a fragmentary view in section of the novel heat exchanger coils of the invention and FIG. 3 is a perspective view of a removable hatch or panel with heat exchanger coils mounted therein in accordance with one embodiment of the invention.

The fluidized bed reactor of the present invention comprises a reactor vessel having a reaction chamber therein, the reaction chamber including a fluidized bed zone in the lower portion thereof and a freeboard zone above the fluidized bed zone, a windbox separated from the reaction chamber by a constriction plate, the constriction plate being capable of supporting a body of particulate solids thereon in the fluidized bed zone, tuyeres mounted in the constriction plate and extending upwardly into the reaction chamber providing gas ports for injecting fluidizing gases into the reaction chamber to thereby form a fluidized bed of the particulate solids in the fluidized bed zone, at least some of the tuyeres having gas ports spaced from the constriction plate at a distance such that a region having a substantial depth of static or quiescent particulate solids is established between the spaced gas ports and the constriction plate, a generally horizontal water header for heat exchange fluid external to the reactor vessel, a generally horizontal steam header for heat exchange fluid external to the reactor vessel and at a level higher than the water header, a plurality of heat exchanger coils in the reactor chamber, the heat exchanger coils each comprising an essentially vertical central section and upper and lower angle bend sections attached to the extremities of the vertical central section, the upper angle bend section passing through the wall of the reactor vessel and connecting the upper end of the vertical central section of said heat exchanger coil to the steam header, the lower angle bend section passing through the wall of the reactor vessel and connecting the lower end of the vertical central section of the heat exchanger coil to the water header, the vertical central section being positioned in the fluidized bed zone of the reactor chamber, the upper angle bend section being positioned in the freeboard zone of the reactor chamber, the lower angle bend section being positioned in the region of static or quiescent particulate solids on the constriction plate.

While the terms "water header" and "steam header" are employed in the description of the apparatus, it will be understood that liquid-vapor systems other than water-steam, such as, for example, acetone or benzene, may be employed in appropriate circumstances.

Referring now to the drawings, in FIG. 1 there is shown a fluidized bed reactor system 10 having a reactor vessel 12 which incorporates vertically disposed heat exchanger coils 30 arranged within reactor 10 in accordance with the present invention. The fluidized bed reactor vessel 12 has a metal outer shell 13 which is lined internally with a layer of refractory insulation 14. The interior of the reactor vessel 12 is divided into two compartments by the constriction plate 16, with a reaction chamber 22 above the constriction plate 16 and a smaller windbox 26 below the constriction plate 16. A plurality of tuyeres 18, arranged in rows, extend upwardly from the constriction plate 16 into the reaction chamber 22. A series of horizontal steel beams 17 near the top of windbox 26 provide support for the constriction plate 16. A gas inlet conduit 27 is provided for supplying fluidizing gases to the windbox 26, the gases being admitted to the reaction chamber 22 through the tuyeres 18. Conduit 25, having access to the freeboard region of the reaction chamber 22, is provided for the purpose of conducting the exhaust gases away from the reaction chamber 22. A conduit 28 passes through the wall of the reaction chamber 22 for replenishing bed material. A preheat burner 23 extends through the wall of the reaction chamber 22 to initiate combustion of the fluidized particulate solids in the chamber. On the constriction plate 16 there is provided a body of solid particulate matter 21 which, in response to the gases admitted into the reaction chamber 22 through tuyeres 18, becomes an expanded fluidized bed occupying the reaction chamber 22 for a substantial depth above constriction plate 16. The body of solid particulate material 21 in the reaction chamber 22 is also characterized, during operation of the reactor, by a region of static solid particulate material 65 immediately above the constriction plate 16 and below the discharge ports of tuyeres 18 (see FIG. 2).

External to the reactor vessel 12 are a steam header 39 and a water header 37. These headers may be annular in configuration surrounding the reactor vessel 12. Connecting the headers 37 and 39 are a plurality of steam coils 30 which enter the reactor vessel 12 and pass through the fluidized bed region 21 of the reactor chamber 22. It will be noted that a natural circulation is provided, from a steam drum 45, also external of the reactor vessel 12, from which downcomer 48 is provided to conduct water from the steam drum 45 to the water header 37 which, as can be seen in FIG. 1, is located at a level somewhat below the constriction plate 16. The water passes upward through heat exchanger coils 30, extracting heat from the fluidized bed 21 thereby vaporizing the water in heat exchanger coils 30 to steam which then passes out of the reactor vessel 12 to the steam headers 39. From the steam header 39 the steam is routed to the steam drum 45 through steam tubes 42. The steam in steam drum 45 is then routed to the point of application (by means not shown).

The heat exchanger coils and the reactor structure with which they are associated are shown in greater detail in FIG. 2. Here it can be seen that the heat exchanger coils 30 joining the water header 37 with the steam header 39 can be considered to be made up of three sections: a vertical central section 31 which passes through the fluidized bed region 21 of reactor vessel 12, a lower angle bend section 33 which connects the vertical section 31 to the water header 37 and an upper angle bend section 32 which connects vertical section 31 with the steam header 39. Tuyeres 18 extend into the reactor chamber 22 a substantial distance so that the ports thereof are at a level which coincides with the lower end of vertical section 31 of the heat exchanger coils 30. Below the level of the tuyere ports a layer 65 of inert solids; for example, sand or refractory rubble, may be provided. It is in this layer of inert solids 65 that the lower angle bend section 33 of the heat exchanger coil 30 is, in part, positioned. Thus, the tube bend 33a which would be especially susceptible to erosion in a fluidized bed of solids is located in the static layer of solids 65 in which erosion does not occur. The loosely packed layer of solids 65 also allows thermal expansion of the heat exchange coils in any direction that the expansion may occur.

The upper angle bend section 32 of the heat exchanger coils 30 is located above the fluidized bed region in the freeboard of the reactor chamber 22 where the effects of intensive fluidization are not observed. Thus, the upper angle bends are not subjected to the erosive conditions prevailing in the fluidized bed 21 but instead, are exposed only to the much less severe conditions which exist in the freeboard region. The upper angle bends 32 are inclined upwardly from their juncture with vertical central section 31 to the point at which they join steam header 39 in order to prevent vapor blockage in the heat exchanger coils 30.

The heat exchanger coils 30 are secured in a hatch member 54 which is removably mounted, as by bolting to the shell 13 of the reactor vessel 12. The hatch itself comprises a metal plate 55 which is lined with a refractory layer 56. A plurality of tube bores 57 are provided through the hatch member 54 to accommodate the heat exchanger coils 30. In passing therethrough to connect to the steam and water headers 39, 37, those portions of the heat exchanger tubes 30 which pass through the refractory 56 of hatches 54 are wrapped in an insulating fiber material 59, for example, Fiberfrax insulation manufactured by the Carborundum Company. The insulating fiber material accommodates coil movement due to thermal expansion without making direct contact with the refractory layer 56. The tube expansion joint 60 or a thermal sleeve 61 allow a certain degree of longitudinal movement of the heat exchanger coils 30 upon heating and cooling. The tube expansion joints 60 accommodate the bending stresses caused by thermal expansion of the coils and minimize the mechanical stresses applied to the hatches 54. The hatches 54 as shown in FIG. 3 provide a unit which can be mounted or removed with relative ease in the wall of reactor vessel 12. The layer of loose particulate material 65 protects the lower angle bends of the heat exchanger coils 30 during operation, but it does not impede withdrawal of the assembled hatch members 54 from the reactor vessel when such removal is required. Reassembly is also quite simple, the hatch member is bolted to the reactor wall of reactor vessel 12 after removal of the layer of particulate solids 65 in the region where the assembly is to occur. Once the hatch mamber 54 is bolted to the wall of reactor vessel 12, particulate solids may be placed in and around and over the angle bends 33 of the heat exchanger coils 30 to the desired depth.

It will be noted that in those areas of the constriction plate into which the heat exchanger coils 30 do not include, a layer of castable or preformed refractory material 64 may be provided. However, it is also possible to provide a layer of refractory particulate solids over the entire surface of the constriction plate 16.

In operation, solid particulate fuel is introduced through the fuel conduit 28. Fluidizing gases, which may be at an elevated temperature, are introduced through inlet conduit 27. The gas passing through inlet conduit 27 traverses the constriction plate 16 through the tuyeres 18 and issues from the tuyere ports to fluidize the particulate solids within the reaction chamber 22, to the extent that the particulate solids are above the level of the tuyere ports. Below the level of the tuyere ports is a layer of particulate solids 65 which is static or quiescent and in which the lower angle bends sections 33 of the heat exchanger coils 30 are imbedded. The combustion gases generated in the bed move through the bed to the freeboard region 22 of the reactor chamber 20. From the freeboard region 22 the gases are removed through the exhaust stack 25 for further treatment and/or disposal. The water-steam circuit has been described previously and it will be understood that the steam generated is taken from the steam drum 45 and conducted to apparatus (not shown) for recovering heat or for power generation or for other purposes.

The fluidized bed reactor of this invention is employed to burn coal as a fuel. Combustion gases from the burning coal often contains large amounts of sulfur compounds which make the gases noxious and discharge of such gases is undesirable from the environmental point of view. The apparatus described herein tends to minimize this problem by lowering the sulfur content in the combustion gases. Decreased sulfur in the exhaust gases is attained by proper temperature control in a fluidized bed with appropriate bed solids.

A limestone bed may also be employed to reduce sulfur in the exhaust gases. For this application, air is admitted through inlet conduit 27. The fluidized bed is composed of limestone or dolomite having an average particle size of up to $\frac{1}{8}$ inch diameter or so. Crushed coal is introduced into the fluidized bed through the fuel conduit 28. The coal burns in the fluidized bed which reaches a temperature of about 1650° F. The sulfur in the coal reacts with the limestone or dolomite of the bed and the product of this reaction, $CaSO_4$, remains in the bed (when dolomite is used, some $MgSO_4$ is also formed). The calcium sulfate thus formed in the fluidized bed may be removed through a discharge conduit (not illustrated) while fresh limestone is introduced through the inlet conduit 28. It is of interest to note that the calcium sulfate discharged from the fluidized bed may be reheated in other apparatus (not shown) to drive off the $SO_2$ gas as the initial step in the production of sulfuric acid, while the lime thus produced may be returned to fluid bed reactor system 10 for reuse in this process.

The water in header 37 is nearly at the temperature of the steam as the source of the water is from the steam drum 39. As the water traverses through the heat exchanger coil 30, the heat transferred into the coils from the fluidized bed causes the water to flash into steam. The amount of steam formed is equal to the total heat transfer in BTUs divided by the latent heat of evaporation.

The combustion gases issuing from exhaust stack 25 are substantially free of sulfur and need only have the dust particles removed therefrom before discharge into the atmosphere.

As has been indicated previously, the violent agitation of the particulate matter in the fluidized bed has an extremely erosive effect on all bends of the heat exchanger coils immersed in the bed, while the vertical tube runs 31 are less subject to erosion. Accordingly, the upper angle bends 32 are positioned well above and out of the fluidized bed of solids to minimize erosion.

The lower angle bends 33, as described above, are embedded in and protected by the static or quiescent layer of particulate solids 65. Since the solid particles in this layer are essentially at rest, and there is substantially no gas flow through this region, which is well below the ports of tuyeres 18, the lower angle bends 33 are subject to little or no erosion.

The tuyere ports should be oriented in such a manner that no impingement of hot gases will occur on the coils. In general, the tuyere ports will be directed toward each other.

A novel arrangement for heat exchanger coils in a fluidized bed reactor has been disclosed which promises improved life for such elements.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A fluidized bed reactor comprising a reactor vessel having a reaction chamber therein, said reaction chamber including a fluidized bed zone in the lower portion thereof and a freeboard zone above said fluidized bed zone, a windbox separated from said reaction chamber by a constriction plate, said constriction plate being capable of supporting a body of particulate solids thereon in said fluidized bed zone, tuyeres mounted in said constriction plate and extending upwardly into said reaction chamber providing gas ports for injecting fluidizing gases into said reaction chamber to thereby form a fluidized bed of said particulate solids in said fluidized bed zone, at least some of said tuyeres having said gas ports spaced from said constriction plate at a distance such that a region having a substantial depth of static or quiescent particulate solids is established between the said spaced gas ports and said constriction plate, a generally horizontal water header for heat exchange fluid external to said reactor vessel, a generally horizontal steam header for heat exchange fluid external to said reactor vessel and at a level higher than said water header, a plurality of heat exchanger coils in said reactor chamber, the arrangement of water header, steam header and heat exchanger coils affording natural circulation of water and steam, said heat exchanger coils each comprising an essentially vertical central section and upper and lower angle bend sections attached to the extremities of said vertical central section, said upper angle bend section passing through the wall of said reactor vessel and connecting the upper end of said vertical central section of said heat exchanger coil to said stream header, said lower angle bend section passing through the wall of said reactor vessel and connecting the lower end of said vertical central section of said heat exchanger coil to said water header, said vertical central section being positioned in said fluidized bed zone of said reactor chamber, said upper angle bend section being positoned in said freeboard zone of said reactor chamber, said lower angle bend section being positioned in said region of static or quiescent particulate solids on said constriction plate and a plurality of removable hatches secured in the wall of said reactor vessel and in each of which are sealingly secured a plurality of said heat exchanger coils whereby said hatches with the heat exchanger coils associated therewith can be removed from the reactor vessel for inspection and maintenance.

2. The fluidized bed reactor of claim 1 wherein said region of static or quiescent particulate solids is provided adjacent the external wall of said reactor vessel.

3. The fluidized bed reactor of claim 2 wherein a layer of refractory ceramic material is provided on said constriction plate in areas not occupied by said region of static or quiescent particulate solids.

4. The fluidized bed reactor of claim 3 wherein said upper angle bend section of said heat exchanger coil is inclined upwardly from the juncture with said vertical central section to the connection with said steam header to prevent vapor blockage of said heat exchanger coil.

5. The fluidized bed reactor of claims 1, 2, 3 or 4 wherein said hatches are lined with refractory ceramic material with said upper and lower angle bend angles extending through said hatches and being sealed and secured therein by insulating refractory fiber wrapping and thermal sleeves or metal expansion joints.

* * * * *

UNITED STATES PATENT AND TRADEMARK OFFICE
CERTIFICATE OF CORRECTION

PATENT NO. : 4314967
DATED : February 9, 1982
INVENTOR(S) : H.S.C. Kwon et al

It is certified that error appears in the above-identified patent and that said Letters Patent are hereby corrected as shown below:

In column 4, line 56, delete "include" and substitute
--intrude--.

In claim 1, line 56, delete "stream" and substitute
--steam--.

Signed and Sealed this

Twentieth Day of April 1982

[SEAL]

Attest:

GERALD J. MOSSINGHOFF

Attesting Officer

Commissioner of Patents and Trademarks